US010240537B2

(12) United States Patent
Cadman et al.

(10) Patent No.: US 10,240,537 B2
(45) Date of Patent: Mar. 26, 2019

(54) METERING VALVE ASSEMBLY AND METHOD OF ASSEMBLY THEREOF

(71) Applicant: GENERAL ELECTRIC COMPANY, Schenectady, NY (US)

(72) Inventors: John Michael Cadman, Mason, OH (US); David Richard Barnhart, Jefferson, OH (US)

(73) Assignee: General Electric Company, Schenectady, NY (US)

( * ) Notice: Subject to any disclaimer, the term of this patent is extended or adjusted under 35 U.S.C. 154(b) by 332 days.

(21) Appl. No.: 15/232,426

(22) Filed: Aug. 9, 2016

(65) Prior Publication Data

US 2018/0045121 A1    Feb. 15, 2018

(51) Int. Cl.
    F16K 15/14    (2006.01)
    F02C 9/26     (2006.01)
    F02C 7/232    (2006.01)
    F16K 1/44     (2006.01)
    F16K 15/02    (2006.01)

(52) U.S. Cl.
    CPC .............. F02C 9/263 (2013.01); F02C 7/232 (2013.01); F16K 1/443 (2013.01); F16K 15/028 (2013.01); F16K 15/148 (2013.01); *Y10T 137/7891* (2015.04); *Y10T 137/87394* (2015.04)

(58) Field of Classification Search
    CPC ........ F02C 9/263; F02C 7/232; F16K 15/028; F16K 1/443; F16K 15/148; Y10T 137/7891; Y10T 137/87394
    USPC ..... 251/122, 330, 332–334; 137/855, 599.18
    See application file for complete search history.

(56) References Cited

U.S. PATENT DOCUMENTS

| 153,801 | A | * | 8/1874 | Biggs | F16K 15/183 |
| | | | | | 137/599.18 |
| 2,658,529 | A | * | 11/1953 | Hensley | F16K 47/06 |
| | | | | | 138/46 |
| 2,893,647 | A | | 7/1959 | Wortman | |
| 3,117,564 | A | | 1/1964 | May | |
| 3,243,157 | A | * | 3/1966 | Beck | F16K 47/04 |
| | | | | | 137/340 |
| 4,031,917 | A | * | 6/1977 | De John | A62B 9/02 |
| | | | | | 137/517 |
| 4,111,369 | A | | 9/1978 | Sharpe | |
| 4,503,884 | A | * | 3/1985 | Spils | F16K 1/54 |
| | | | | | 137/454.6 |

(Continued)

FOREIGN PATENT DOCUMENTS

| JP | 2007224829 A | 9/2007 |
| WO | 2011018503 A1 | 2/2011 |

*Primary Examiner* — John Bastianelli
(74) *Attorney, Agent, or Firm* — General Electric Company; Kristi Davidson

(57) ABSTRACT

A valve assembly includes a body including an inlet port, an outlet port, and a flow passage extending therebetween. The flow passage includes a plurality of valve seats in a stepped arrangement between the inlet port and the outlet port. The valve assembly further includes a valve stem positioned within the flow passage. The valve stem includes at least one shaft and a poppet disk positioned at one end of the at least one shaft, and at least one reed petal coupled to the at least one shaft. The poppet disk is engageable with a first valve seat of the plurality of valve seats, and the at least one reed petal is engageable with a second valve seat of the plurality of valve seats.

12 Claims, 4 Drawing Sheets

(56) References Cited

U.S. PATENT DOCUMENTS

| | | | | |
|---|---|---|---|---|
| 4,549,718 A | * | 10/1985 | Seger | F16K 47/04 |
| | | | | 251/121 |
| 5,113,908 A | * | 5/1992 | Steinke | F16K 47/04 |
| | | | | 137/625.3 |
| 5,388,613 A | * | 2/1995 | Kruger | A62B 9/022 |
| | | | | 137/625.34 |
| 5,485,957 A | | 1/1996 | Sturman | |
| 5,601,112 A | * | 2/1997 | Sekiya | F16K 15/148 |
| | | | | 137/512.15 |
| 6,386,234 B2 | * | 5/2002 | Sontag | F16K 1/443 |
| | | | | 137/625.34 |
| 2008/0053530 A1 | | 3/2008 | Knight et al. | |

* cited by examiner

METERING VALVE ASSEMBLY AND METHOD OF ASSEMBLY THEREOF

STATEMENT REGARDING FEDERALLY SPONSORED RESEARCH AND DEVELOPMENT

This invention was made with Government support under contract number FA8650-09-D-2922 awarded by the United States Air Force. The Government has certain rights in this invention.

BACKGROUND

The field of the disclosure relates generally to gas turbine engines and, more particularly, to a metering valve assembly for a gas turbine engine.

Gas turbine engines, such as turbofans, generally include a fan, a core engine, and a power turbine. The core engine includes at least one compressor, a combustor, and a high-pressure turbine coupled together in a serial flow relationship. More specifically, the compressor and high-pressure turbine are coupled through a rotatable shaft to form a high-pressure rotor assembly. Air entering the combustor is mixed with fuel channeled from a fuel tank and ignited to form a high energy gas stream. The high energy gas stream flows through the high-pressure turbine to rotatably drive the high-pressure turbine such that the shaft rotatably drives the compressor. The gas stream expands as it flows through a power or low-pressure turbine positioned aft of the high-pressure turbine. The low-pressure turbine includes a rotor assembly having a fan coupled to a drive shaft. The low-pressure turbine rotatably drives the fan through the drive shaft. Typically, during gas turbine engine operation, significant heat is produced that raises the temperature of surrounding engine components.

At least some known gas turbine engines use the fuel channeled to the combustor as a coolant for thermal control of the engine components. For example, fuel from the fuel tank is generally at ambient temperature, when the fuel is channeled from the fuel tank to the combustor, the fuel is used as a coolant to extract heat from an engine component. The high temperature fuel is then mixed with compressed air from the compressor and ignited in the combustor to form the high energy gas stream. However, when fuel is subjected to high temperatures, hydrocarbon reactions therein are accelerated resulting in new organic compounds, also known as gum or varnish, that can form and aggregate within fuel system components such as valves. One known solution to reduce the effects of varnish accumulation within the valves is to increase the clearances between valve components. However, increasing the clearance within the at least some valves decrease the valves' operability.

BRIEF DESCRIPTION

In one aspect, a valve assembly is provided. The valve assembly includes a body including an inlet port, an outlet port, and a flow passage extending therebetween. The flow passage includes a plurality of valve seats in a stepped arrangement between the inlet port and the outlet port. The valve assembly further includes a valve stem positioned within the flow passage. The valve stem includes at least one shaft and a poppet disk positioned at one end of the at least one shaft, and at least one reed petal coupled to the at least one shaft. The poppet disk is engageable with a first valve seat of the plurality of valve seats, and the at least one reed petal is engageable with a second valve seat of the plurality of valve seats.

In another aspect, a gas turbine engine system is provided. The gas turbine engine system includes a combustor including a fuel nozzle. A valve assembly coupled in flow communication with the fuel nozzle. The valve assembly configured to channel a fluid from a fuel line to the fuel nozzle. The valve assembly includes a body including an inlet port, an outlet port, and a flow passage extending therebetween. The flow passage includes a plurality of valve seats in a stepped arrangement between the inlet port and the outlet port. The valve assembly further includes a valve stem positioned within the flow passage. The valve stem includes at least one shaft and a poppet disk positioned at one end of the at least one shaft, and at least one reed petal coupled to the at least one shaft. The poppet disk is engageable with a first valve seat of the plurality of valve seats, and the at least one reed petal is engageable with a second valve seat of the plurality of valve seats.

In yet another aspect, a method of assembling a valve is provided. The valve includes a body including an inlet port, an outlet port, and a flow passage extending therebetween. The flow passage includes a plurality of valve seats in a stepped arrangement between the inlet port and the outlet port. The method includes coupling at least one reed petal to at least one shaft including a poppet disk positioned at one end of the at least one shaft to form a valve stem. The method further includes positioning the valve stem within the flow passage such that the poppet disk is engageable with a first valve seat of the plurality of valve seats, and the at least one reed petal is engageable with a second valve seat of the plurality of valve seats.

DRAWINGS

These and other features, aspects, and advantages of the present disclosure will become better understood when the following detailed description is read with reference to the accompanying drawings in which like characters represent like parts throughout the drawings, wherein.

Figure 1:
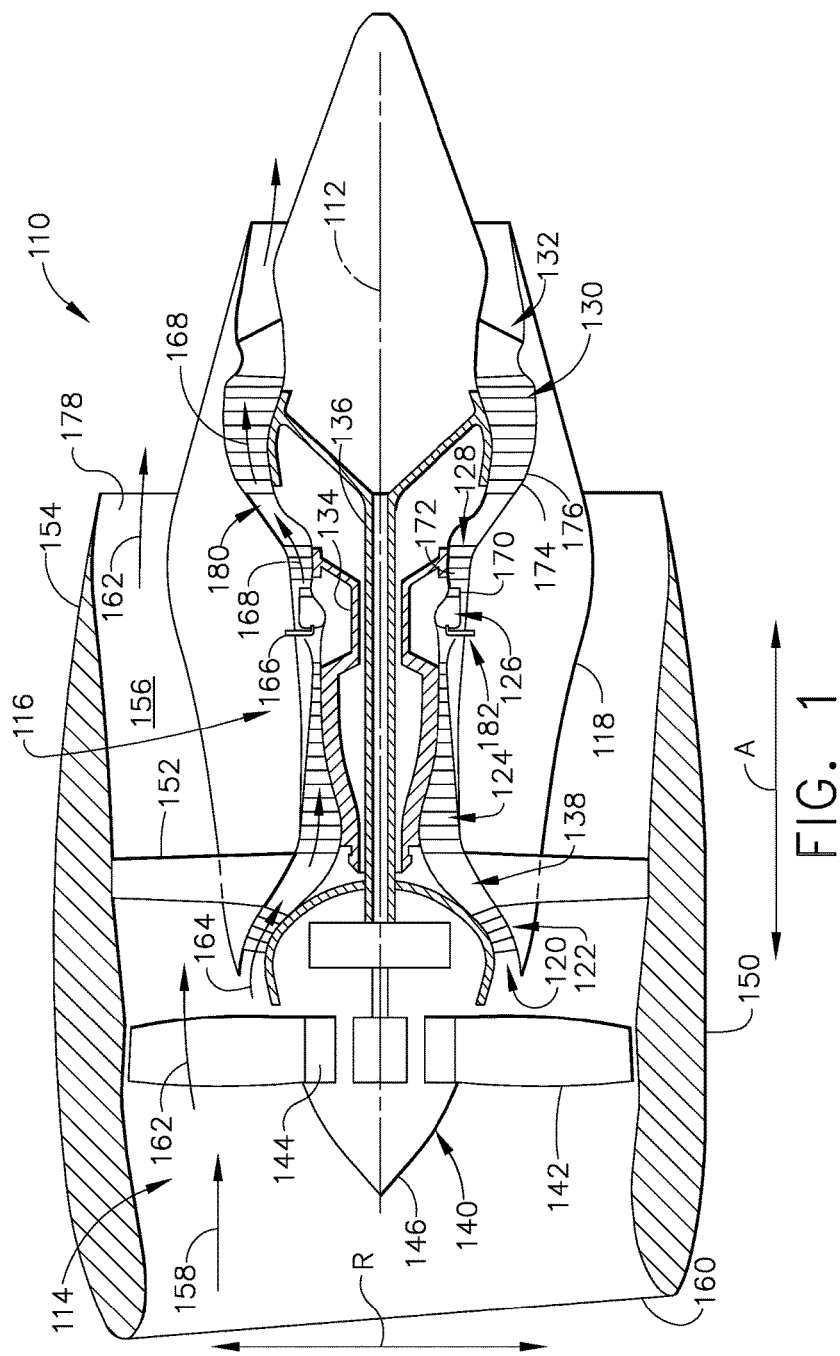
FIG. 1 is a schematic, cross-sectional illustration of an exemplary gas turbine engine in accordance with an example embodiment of the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of a valve assembly as described herein provide a valve that facilitates metering of a fluid flow therethrough and also reduces varnish and gum accumulation therein. Specifically, the valve assembly described herein includes a body with a flow passage defined therethrough. The valve assembly includes a poppet disk and at least one reed petal coupled to a valve stem positioned within the flow passage. In a closed valve position, the poppet disk is seated within a first valve seat within the body and the reed petal is engaged with a second valve seat within the body. As fluid flow builds pressure at a valve inlet, the poppet disk becomes unseated and fluid flow is channeled through the flow passage to the reed petal which remains engaged with the valve seat. Fluid flow continues to build pressure at the reed petal until it is disengaged and in a valve open position wherein fluid flow is channeled through a valve outlet. In some embodiments, the reed petal includes apertures defined therein that allow a portion of the fluid flow to be channeled therethrough. By combining fluid flow across high gain reed valves and low gain apertures, metering control of the fluid flow is facilitated. Additionally, the valve assembly requires no tight clearance and/or sliding contact surfaces, as such, varnish and gum accumulation from deposits within the fluid flow are reduced.

FIG. 1 is a schematic cross-sectional view of a gas turbine engine in accordance with an exemplary embodiment of the present disclosure. In the exemplary embodiment, the gas turbine engine is a high-bypass turbofan jet engine 110, referred to herein as "turbofan engine 110." As shown in FIG. 1, turbofan engine 110 defines an axial direction A (extending parallel to a longitudinal centerline 112 provided for reference) and a radial direction R (extending perpendicular to longitudinal centerline 112). In general, turbofan engine 110 includes a fan case assembly 114 and a gas turbine engine 116 disposed downstream from fan case assembly 114.

Gas turbine engine 116 includes a substantially tubular outer casing 118 that defines an annular inlet 120. Outer casing 118 encases, in serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122. The compressor section, combustion section 126, turbine section, and exhaust nozzle section 132 together define a core air flow path 138.

In the exemplary embodiment, fan case assembly 114 includes a fan 140 having a plurality of fan blades 142 coupled to a disk 144 in a spaced apart manner. As depicted, fan blades 142 extend outwardly from disk 144 generally along radial direction R. Fan blades 142 and disk 144 are together rotatable about longitudinal centerline 112 by LP shaft 136.

Referring still to the exemplary embodiment of FIG. 1, disk 144 is covered by rotatable front hub 146 aerodynamically contoured to promote an airflow through plurality of fan blades 142. Additionally, exemplary fan case assembly 114 includes an annular fan casing or outer nacelle 150 that circumferentially surrounds fan 140 and/or at least a portion of gas turbine engine 116. It should be appreciated that nacelle 150 may be configured to be supported relative to gas turbine engine 116 by an outlet guide vane assembly 152. Moreover, a downstream section 154 of nacelle 150 may extend over an outer portion of gas turbine engine 116 so as to define a bypass airflow passage 156 therebetween.

During operation of turbofan engine 110, a volume of air 158 enters turbofan 110 through an associated inlet 160 of nacelle 150 and/or fan case assembly 114. As air 158 passes across fan blades 142, a first portion of air 158 as indicated by arrows 162 is directed or routed into bypass airflow passage 156 and a second portion of air 158 as indicated by arrows 164 is directed or routed into core air flow path 138, or more specifically into booster compressor 122. The ratio between first portion of air 162 and second portion of air 164 is commonly known as a bypass ratio. The pressure of second portion of air 164 is then increased as it is routed through HP compressor 124 and into combustion section 126, where it is mixed with fuel 166 and burned to provide combustion gases 168.

Combustion gases 168 are routed through HP turbine 128 where a portion of thermal and/or kinetic energy from combustion gases 168 is extracted via sequential stages of HP turbine stator vanes 170 that are coupled to outer casing 118 and HP turbine rotor blades 172 that are coupled to HP shaft or spool 134, thus causing HP shaft or spool 134 to rotate, thereby supporting operation of HP compressor 124. Combustion gases 168 are then routed through LP turbine 130 where a second portion of thermal and kinetic energy is extracted from combustion gases 168 via sequential stages of LP turbine stator vanes 174 that are coupled to outer casing 118 and LP turbine rotor blades 176 that are coupled to LP shaft or spool 136, thus causing LP shaft or spool 136 to rotate, thereby supporting operation of booster compressor 122 and/or rotation of fan 140. Combustion gases 168 are subsequently routed through jet exhaust nozzle section 132 of core gas turbine engine 116 to provide propulsive thrust. Simultaneously, the pressure of first portion of air 162 is substantially increased as first portion of air 162 is routed through bypass airflow passage 156, including through outlet guide vane assembly 152 before it is exhausted from a fan nozzle exhaust section 178 of turbofan engine 110, also providing propulsive thrust. HP turbine 128, LP turbine 130, and jet exhaust nozzle section 132 at least partially define a hot gas path 180 for routing combustion gases 168 through gas turbine engine 116.

In the exemplary embodiment, fuel 166 that is mixed with compressed air 164 and burned within combustion section 126 is provided by a fuel system 182. Fuel system 182 channels fuel 166 from a fuel tank (not shown and separate from turbofan engine 110) to combustion section 126. In some embodiments, fuel system 182 is thermally coupled to components of turbofan engine 110, such as actuators and valves, to extract heat and cool the components because fuel 166 within the fuel tank is typically cooler and at ambient air temperature. The higher temperature fuel 166 is then channeled to combustion section 126.

It should be appreciated, however, that exemplary turbofan engine 110 depicted in FIG. 1 is by way of example only, and that in other exemplary embodiments, turbofan engine 110 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a military purpose engine, and a marine or land-based aero-destructive engine.

Figure 2:
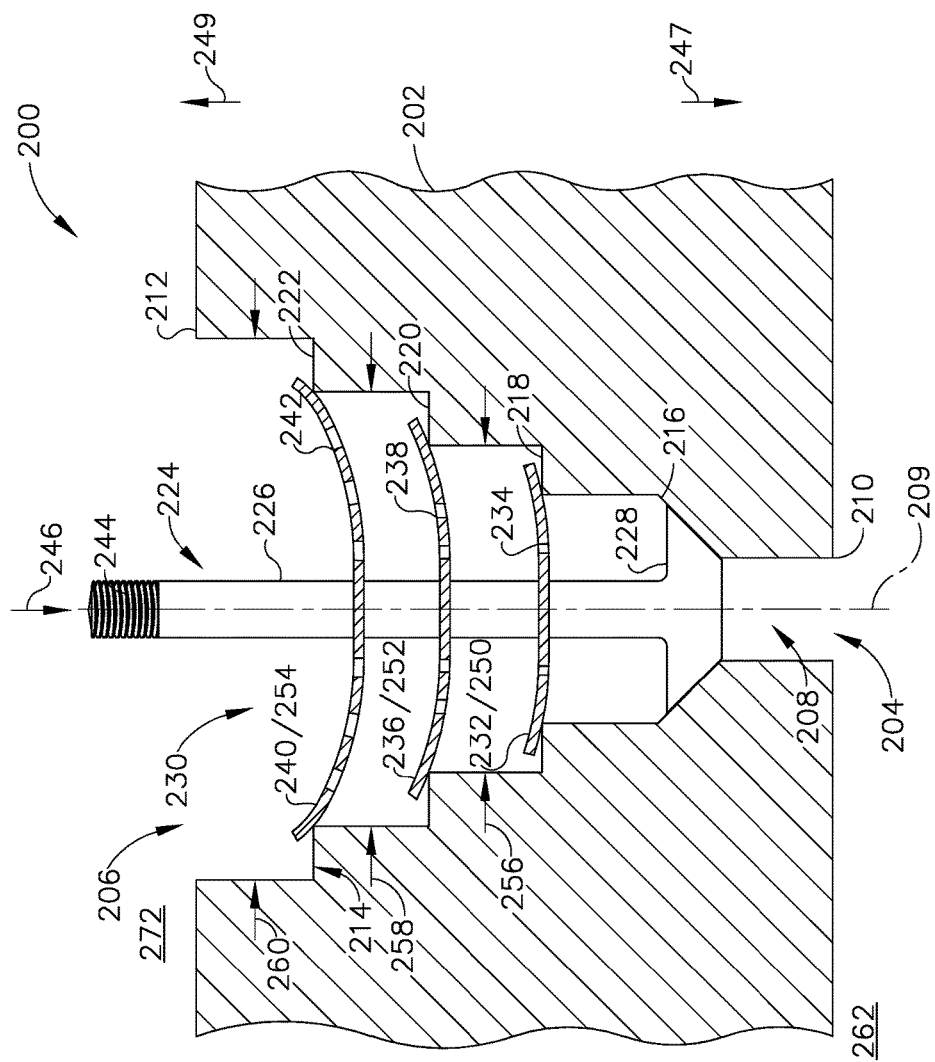
FIG. 2 is a schematic, cross-sectional view of an exemplary metering valve assembly of the turbofan engine shown in FIG. 1 in a closed position.
Figure 3:
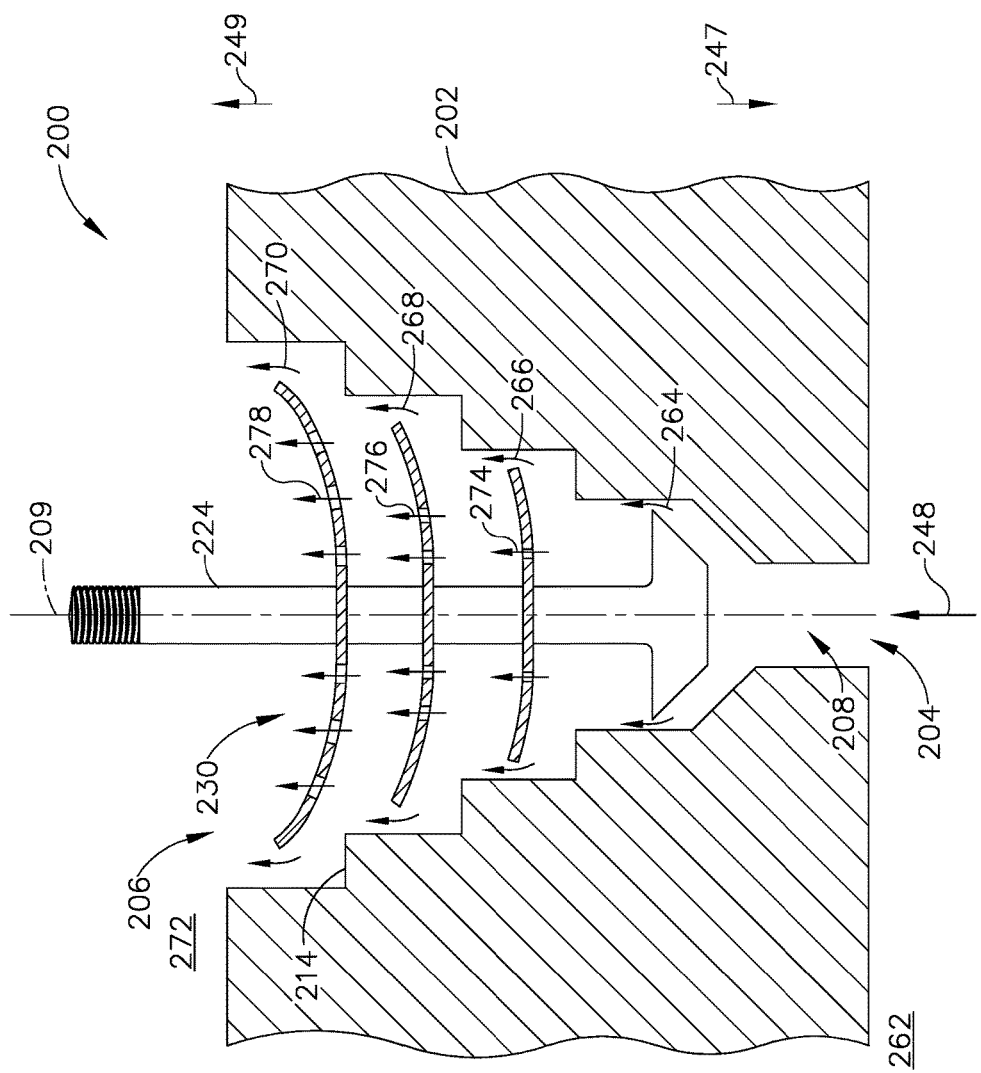
FIG. 3 is a schematic, cross-sectional view of the metering valve assembly shown in FIG. 2 in an open position.

FIG. 2 is a schematic cross-sectional view of an exemplary metering valve assembly 200 of turbofan engine 110 (shown in FIG. 1) in a closed position. FIG. 3 is a schematic cross-sectional view of metering valve assembly 200 (shown in FIG. 2) in an open position. Referencing FIGS. 2 and 3, in the exemplary embodiment, valve assembly 200 is coupled in flow communication with fuel system 182 upstream of a fuel nozzle (not shown) included within combustion section 126 (shown in FIG. 1). Valve assembly 200 includes a valve body 202 having an inlet port 204 and an outlet port 206 defining a flow passage 208 extending therebetween along a longitudinal axis 209. In the exemplary embodiment, inlet port 204 and outlet port 206 are generally circular with a cross-sectional area 210 of inlet port 204 being less than a cross-sectional area 212 of outlet port 206. In alternative embodiments, inlet and outlet ports 204 and 206 have any other shape and/or size that enables valve assembly 200 to function as described herein. Between inlet port 204 and outlet port 206, valve body 202 includes a plurality of valve seats 214 in a stepped diverging arrangement along a direction from inlet port 204 to outlet port 206. In the exemplary embodiment, valve body 202 has a first valve seat 216, a second valve seat 218, a third valve seat 220, and a fourth valve seat 222. In alternative embodiments, valve body 202 includes any other number of valve seats 214 that enables valve assembly 200 to function as described herein.

Valve assembly 200 further includes a valve stem 224 positioned in flow passage 208 extending along longitudinal axis 209 and surrounded by valve body 202. Valve stem 224 includes a shaft 226 and a poppet disk 228 positioned at one end of shaft 226. In the exemplary embodiment, valve stem 224 generally has a cylindrical shape and poppet disk 228 generally has a frustoconical shape. In alternative embodiments, valve stem 224 and poppet disk 228 have any other shape that enables valve assembly 200 to function as described herein. Further, in the exemplary embodiment, valve stem 224 includes a plurality of reed petals 230 coupled to shaft 226. For example, valve stem 224 includes a first reed petal 232 with at least one aperture 234 defined therein, a second reed petal 236 with at least one aperture 238 defined therein, and a third reed petal 240 with at least one aperture 242 defined therein, each coupled along a length of shaft 226. In alternative embodiments, valve stem 224 includes any other number of reed petals 230 that enables valve assembly 200 to function as described herein.

In the exemplary embodiment, valve stem 224 further includes a bias member 244, for example a spring, coupled to shaft 226 opposite poppet disk 228. Bias member 244 generates a force 246 opposing a fluid flow 248 such that valve stem 224 is engaged with valve body 202 and valve assembly 200 is in a closed position, as shown in FIG. 2, which prevents fluid flow 248 from flowing through flow passage 208. In the exemplary embodiment, force 246 acts in a valve closing direction illustrated by arrow 247. While fluid flow 248 is in an opposite direction and along valve opening direction illustrated by arrow 249. Poppet disk 228 is seated within first valve seat 216 that has a corresponding frustoconical shape. First reed petal 232 is engaged with second valve seat 218, second reed petal 236 is engaged with third valve seat 220, and third reed petal 240 is engaged with fourth valve seat 222. In alternative embodiments, bias member 244 is any other device that allows force 246 to be generated and enables valve assembly 200 to function as described herein.

Further in the exemplary embodiment, the plurality of reed petals 230 are progressively sized such that each reed petal 230 disengages with its respective valve seat 214 separately from one another. For example, each reed petal 230 generally has a circular shape such that first reed petal 232 includes a surface area 250 that is less than a surface area 252 of second reed petal 236, and surface area 252 of second reed petal 236 is less than a surface area 254 of third reed petal 240. Additionally, second valve seat 218 generally has a cylindrical shape with a diameter 256. Diameter 256 of second valve seat 218 is less than a diameter 258 of cylindrical third valve seat 220. Diameter 258 of third valve seat 220 is less than a diameter 260 of cylindrical fourth valve seat 222. As such, each valve seat 214 is configured in a stepped diverging arrangement between inlet port 204 and outlet port 206. In alternative embodiments, each reed petal 230 and respective valve seats 214 have any other shape and/or size that enables valve assembly 200 to function as described herein. In other alternative embodiments, valve body 202 has a uniform stepped arrangement such that each reed petal 230 and each valve seat 214 are substantially similar in shape and size.

In operation, fuel system 182 channels fuel to combustion section 126. Upstream of a fuel nozzle (not shown), valve assembly 200 facilitates flow metering and flow split control such that hot streaking is reduced within combustion section 126. Fluid flow 248 is channeled to an upstream section 262 of valve assembly 200. Initially, valve assembly 200 is in a closed position as force 246 engages poppet disk 228 within first valve seat 216 with a pre-determined load, as illustrated in FIG. 2. Poppet disk 228 reduces fluid leakage through flow passage 208 when valve assembly 200 is in a closed position. As fluid flow 248 is increased, fluid pressure builds up at inlet port 204 until the pressure overcomes force 246 and poppet disk 228 and valve stem 224 unseat from first valve seat 216 moving to a first open position. However, when poppet disk 228 and valve stem 224 unseat from body 202, each of the plurality of reed petals 230 have a predetermined pre-tensioning such that reed petals 230 continue to be engaged with respective valve seats 214.

When poppet disk 228 is unseated from first valve seat 216, fluid flow 248 is channeled 264 around poppet disk 228 towards first reed petal 232. Fluid flow 248 builds up pressure at first reed petal 232, which is engaged with second valve seat 218, until force 246 of bias member 244 is overcome and valve stem 224 moves along longitudinal axis 209 to a second open position and first reed petal 232 disengages with second valve seat 218. Fluid flow 248 is then channeled 266 around first reed petal 232 to second reed petal 236 that is still engaged with third valve seat 220 because of pre-tensioning therein. Similarly, pressure builds up at second reed petal 236, which is engaged with third valve seat 220, until force 246 of bias member 244 is overcome and valve stem 224 moves along longitudinal axis 209 to a third open position and second reed petal 236 disengages with third valve seat 220. Fluid flow 248 is then channeled 268 around second reed petal 236 to third reed petal 240 that is still engaged with fourth valve seat 222 because of pre-tensioning therein. Finally, pressure builds up at third reed petal 240, which is engaged with fourth valve seat 222, until force 246 of bias member 244 is overcome and valve stem 224 moves along longitudinal axis 209 to a fourth open position as illustrated in FIG. 3 and third reed petal 240 disengages with fourth valve seat 222. Fluid flow 248 is then channeled 270 around third reed petal 240 to outlet port 206 and exiting valve assembly 200 at a downstream section 272. In alternative embodiments, when poppet disk 228 is unseated from first valve seat 216, valve stem 224 is moved along longitudinal axis 209 to a first open position. As fluid flow 248 is channeled towards reed petals 230, valve stem 224 stays at the first open position and reed petals 230 deflect such that each of the plurality of reed petals 230 disengages with the respective valve seats 214 allowing fluid flow 248 therethrough. Furthermore, in alternative embodiments, when valve stem 224 is moved along longitudinal axis 209 to the first open position, any number of reed petals 230 may stay engaged with the respective valve seats 214, and any other number of reed petals 230 may disengage with the respective valve seats 214. For example, first reed petal 232 disengages with second valve seat 218 and second reed petal 236 stays engaged with third valve seat 220.

In the exemplary embodiment, each of the plurality of reed petals 230 has a different predetermined pre-tensioning value such that reed petals 230 remain engaged with the respective valve seats 214 as described above. For example, third reed petal 240 has a greater pre-tension value than second reed petal 236, while second reed petal 236 has a greater pre-tension valve than first reed petal 232. In alternative embodiments, each of the plurality of reed petals 230 has a predetermined pre-tensioning value that are of any other value that enables valve assembly 200 to function as described herein, for example, reed petals 230 all may have substantially equal pre-tensioning.

Furthermore, in the exemplary embodiment, each of the plurality of reed petals 230 is generally high gain, wherein valve gain is a ratio of change in flow to a corresponding change in valve position. Typically, high gain valves provide a low amount of metering control because flow rates therethrough change quickly in response to valve or petal position. As such, to facilitate increased metering control in valve assembly 200, each reed petal 230 includes at least one aperture, such as apertures 234, 238, and 242, defined therein. For example, first reed petal 232 channels a portion 274 of fluid flow 248 through apertures 234, while second reed petal 236 channels a portion 276 of fluid flow 248 through apertures 238, and third reed petal 240 channels a portion 278 of fluid flow 248 through apertures 242. Apertures 234, 238, and 242 defined within each reed petal 230 are general low gain such that metering control through valve assembly 200 is increased. As such, metering control through valve assembly 200 is accomplished through a combination of fluid flow 248 across low gain apertures 234, 238, and 242 and high gain poppet disk 228 and high gain reed petals 230.

Apertures 234, 238, and 242 are sized, shaped, and/or numbered such that metering control of fluid flow 248 is provided at each of the plurality of reed petals 230 and throughout flow passage 208. For example, first reed petal 232 has apertures 234 that are sized and/or numbered such that fluid flow 248 through first reed petal 232 is continuously metered as fluid flow 248 builds up pressure at first reed petal 232 until disengagement with second valve seat 218. Similarly, second reed petal 236 has apertures 238 that are sized and/or numbered such that fluid flow 248 through second reed petal 236 is continuously metered as fluid flow 248 builds up pressure at second reed petal 236 until disengagement with third valve seat 220. Third reed petal 240 has apertures 242 that are sized and/or numbered such that fluid flow 248 through third reed petal 240 is continuously metered as fluid flow 248 builds up pressure at third reed petal 240 until disengagement with fourth valve seat 222. In alternative embodiments, apertures 234, 238, and 242 may have any other size, shape, or numbers that enables valve assembly 200 to function as described herein. In other embodiments, some reed petals 232, 236, or 240 may not have any apertures defined therein.

Moreover, in the exemplary embodiment, valve assembly 200 reduces varnish accumulation therein because valve assembly 200 requires no tight clearance and/or sliding contact surfaces. In some embodiments, fuel system 182 facilitates thermal control of turbofan engine 110. As such, fluid flow 248 may have an increased temperature which in turn increases varnish and gum accumulation within fuel system 182. Generally, reed and poppet type valves, such as poppet disk 228 and the plurality of reed petals 230, facilitate a decrease in varnish and gum accumulation because there are few tight clearances and/or sliding contact surfaces.

Figure 4:
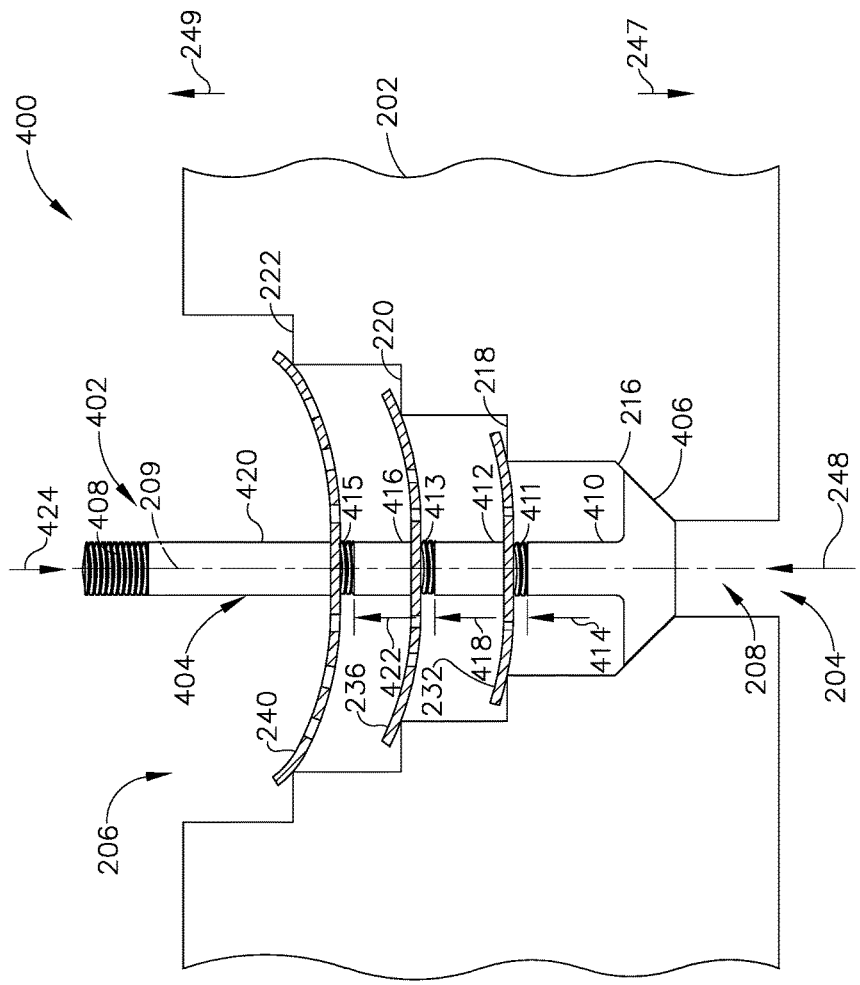
FIG. 4 is a schematic, cross-sectional view of another exemplary metering valve assembly that may be used in the turbofan engine shown in FIG. 1.

FIG. 4 is a schematic cross-sectional view of another exemplary metering valve assembly 400 that may be used in turbofan engine 110 (shown in FIG. 1). With reference to FIGS. 2 and 3, this exemplary embodiment of valve assembly 400 is substantially identical to the embodiment described above, except as described herein. For example, valve assembly 400 includes body 202 having inlet port 204 and outlet port 206 defining flow passage 208 therethrough extending along longitudinal axis 209. Between inlet port 204 and outlet port 206, valve body 202 includes first valve seat 216, second valve seat 218, third valve seat 220, and fourth valve seat 222. However, in this exemplary embodiment, valve assembly 400 includes a valve stem 402 that includes a plurality of shafts 404.

In this embodiment, valve stem 402 includes shafts 404 with a poppet disk 406 positioned at one end of shafts 404 and a bias member 408 at the other end of shafts 404. The plurality of shafts 404 includes a first shaft 410 and a first bias member 411 coupled to poppet disk 406. A second shaft 412 and a second bias member 413 is coupled to first reed petal 232, second shaft 412 is offset 414 a predetermined distance from first shaft 410 where first bias member 411 is positioned. A third shaft 416 and a third bias member 415 is coupled to second reed petal 236, third shaft 416 is offset 418 a predetermined distance from second shaft 412 where second bias member 413 is positioned. A fourth shaft 420 coupled to third reed petal 240 and bias member 408, fourth shaft 420 is offset 422 a predetermined distance from third shaft 416 where third bias member 415 is positioned.

In operation, valve assembly 400 rests in a closed position as illustrated in FIG. 4, such that poppet disk 406 engages within first valve seat 216 and the plurality of reed petals 230 engages with the respective valve seats 214. As fluid flow 248 is increased, fluid pressure is built up at inlet port 204 until poppet disk 406 and first shaft 410 overcomes first bias member 411 and unseat from first valve seat 216 moving valve stem 402 to a first open position wherein first shaft 410 has closed offset distance 414. Similarly, as fluid flow 248 continues through flow passage 208, first reed petal 232 overcomes bias member 413 and disengages with second valve seat 218 moving valve stem 402 to a second open position wherein second shaft 412 has closed offset distance 418. When second reed petal 236 overcomes bias member 415 and disengages with third valve seat 220, valve stem 402 moves to a third open position wherein third shaft 416 has closed offset distance 422. Finally, fluid flow 248 builds up pressure at third reed petal 240, which is engaged with fourth valve seat 222, until a force 424 of fourth bias member 408 is overcome and valve stem 402 including the plurality of shafts 404 moves along longitudinal axis 209 to a fourth open position.

In the exemplary embodiment, each bias member 408, 411, 413, and/or 415 has a similar bias force; however, in alternative embodiments each bias member 408, 411, 413, and/or 415 may have different bias forces. Additionally or alternatively, one or all of bias members 408, 411, 413, and/or 415 are coupled to valve body 202. For example, first bias member 411 is coupled to valve body 202 adjacent to first valve seat 216 to bias first shaft 410, second bias member 413 is coupled to valve body 202 adjacent to second valve seat 218 to bias second shaft 412, third bias member 415 is coupled to valve body 202 adjacent to third valve seat 220 to bias third shaft 416, and fourth bias member 408 is coupled to valve body 202 adjacent to fourth valve seat 222 to bias fourth shaft 420.

The above-described embodiments of a valve assembly facilitate a valve that can meter fluid flow therethrough and also reduce varnish and gum accumulation therein. Specifically, the valve assembly described herein includes a body with a flow passage defined therethrough. The valve assembly includes a poppet disk and at least one reed petal coupled to a valve stem positioned within the flow passage. In a closed valve position, the poppet disk is seated within a first valve seat within the body and the reed petal is engaged with a second valve seat within the body. As fluid flow builds pressure at a valve inlet, the poppet disk becomes unseated and fluid flow is channeled through the flow passage to the reed petal which remains engaged with the valve seat. Fluid flow continues to build pressure at the reed petal until it is disengaged and in a valve open position wherein fluid flow is channeled through a valve outlet. In some embodiments, the reed petal includes apertures defined therein that allow a portion of the fluid flow to be channeled therethrough. By combining fluid flow across high gain reed valves and low gain apertures, metering control of the fluid flow is facilitated. Additionally, the valve assembly requires no tight clearance and/or sliding contact surfaces, as such, varnish and gum accumulation from deposits within the fluid flow are reduced.

An exemplary technical effect of the methods, systems, and apparatus described herein includes at least one of: (a) increasing fluid flow metering; (b) reducing varnish and gum accumulation within the metering valve; (c) reducing valve hysteresis; (d) increasing fluid flow split control; and (e) decreasing hot streaking within combustor.

Exemplary embodiments of methods, systems, and apparatus for the valve assembly are not limited to the specific embodiments described herein, but rather, components of the systems and/or steps of the methods may be utilized independently and separately from other components and/or steps described herein. For example, the methods may also be used in combination with other systems requiring flow metering and reduced varnish accumulation, and the associated methods, and are not limited to practice with only the systems and methods as described herein. Rather, the exemplary embodiment can be implemented and utilized in connection with many other applications, equipment, and systems that may benefit from flow metering and reduced varnish accumulation.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A valve assembly comprising:
   a body comprising an inlet port, an outlet port, and a flow passage extending therebetween and comprising a plurality of valve seats in a stepped arrangement between said inlet port and said outlet port; and
   a valve stem positioned within said flow passage and comprising at least one shaft, a poppet disk positioned at one end of said at least one shaft, and at least one reed petal coupled to said at least one shaft, wherein said poppet disk is engageable with a first valve seat of said plurality of valve seats, and said at least one reed petal is engageable with a second valve seat of said plurality of valve seats.

2. The valve assembly in accordance with claim 1, wherein said valve stem further comprises a bias member configured to apply a force to said at least one shaft in a closing direction.

3. The valve assembly in accordance with claim 1, wherein said poppet disk and said at least one reed petal engages with said respective valve seat of said plurality of valve seats in a closed valve position.

4. The valve assembly in accordance with claim 1, wherein said valve stem is configured to progressively unseat from said body during valve opening.

5. The valve assembly in accordance with claim 1, wherein said at least one reed petal comprises at least one aperture.

6. The valve assembly in accordance with claim 5, wherein said at least one reed petal comprises a plurality of reed petals, a first reed petal of said plurality of reed petals comprises a first number of apertures and a second reed petal of said plurality of reed petals comprises a second number of apertures, wherein said first number is greater than said second number.

7. The valve assembly in accordance with claim 1, wherein said at least one reed petal is pre-tensioned.

8. The valve assembly in accordance with claim 1, wherein said at least one reed petal comprises a plurality of reed petals, a first reed petal of said plurality of reed petals comprises a first pre-tension and a second reed petal of said plurality of reed petals comprises a second pre-tension, wherein said first pre-tension is greater than said second pre-tension.

9. The valve assembly in accordance with claim 1, wherein said at least one reed petal comprises a plurality of reed petals, a surface area of a first reed petal of said plurality of reed petals is less than a surface area of a second reed petal of said plurality of reed petals.

10. The valve assembly in accordance with claim 1, wherein said plurality of valve seats are in a stepped diverging arrangement such that a cross-sectional area of said inlet port is less than a cross-sectional area of said outlet port.

11. The valve assembly in accordance with claim 1, wherein said at least one shaft comprises a plurality of shafts each offset a predetermined distance from one another.

12. The valve assembly in accordance with claim 11, wherein said at least one reed petal comprises a plurality of reed petals, each reed petal of said plurality of reed petals is coupled to said respective shaft of said plurality of shafts.

* * * * *